United States Patent [19]

Kawasaki et al.

[11] Patent Number: 4,991,077
[45] Date of Patent: Feb. 5, 1991

[54] PROGRAMMABLE OPERATOR'S CONSOLE

[75] Inventors: Kikuo Kawasaki, Kanagawa; Sigeo Kawasima, Chiba; Takasi Miyata; Kenji Fujita, both of Saitama, all of Japan

[73] Assignee: Fuji Electric Co., Ltd., Kawasaki, Japan

[21] Appl. No.: 188,391
[22] PCT Filed: Jul. 27, 1987
[86] PCT No.: PCT/JP87/00546
  § 371 Date: Jun. 3, 1988
  § 102(e) Date: Jun. 3, 1988
[87] PCT Pub. No.: WO88/01088
  PCT Pub. Date: Feb. 11, 1988

[30] Foreign Application Priority Data

Jul. 29, 1986 [JP] Japan ................... 61-176692
Jul. 29, 1986 [JP] Japan ................... 61-176693
Jul. 29, 1986 [JP] Japan ................... 61-176694

[51] Int. Cl.⁵ ............................................. G06F 15/46
[52] U.S. Cl. .................................... 364/188; 364/474.22
[58] Field of Search ............................. 364/140–147, 364/188, 189, 474.22; 340/753

[56] References Cited

U.S. PATENT DOCUMENTS 4,001,807 1/1977 Dallimonti ........................ 364/189
4,601,004 7/1986 Holt et al. ......................... 364/146
4,635,183 1/1987 Isobe et al. ....................... 364/141
4,697,231 9/1987 Boytor ............................. 364/188

Primary Examiner—Jerry Smith
Assistant Examiner—Paul Gordon
Attorney, Agent, or Firm—Brumbaugh, Graves, Donohue & Raymond

[57] ABSTRACT

A programmable operator's console adapted to control an external apparatus comprises a display panel, having a display screen and a plurality of transparent touch-sensitive switches disposed in the display screen, and a central processing unit, connected with the external apparatus and the display panel. The display panel displays an image of a plurality of switch regions superimposed on the touch-sensitive switches, and displays labels, each of which indicates the function of each of the touch-sensitive switches in its respective switch regions, indicates control data based upon which operation of the external apparatus is controlled, and indicates apparatus data indicative of the result of the control and the operational status of the external apparatus. The central processing unit supplies the control data from the external apparatus in response to actuation from the touch-sensitive switches and assigns multiple functions to each of the touch-sensitive switches by altering the images of the plurality of switch regions and by altering the labels in the switch regions in accordance with the apparatus data from the external apparatus in response to actuation of the touch-sensitive switches.

13 Claims, 10 Drawing Sheets

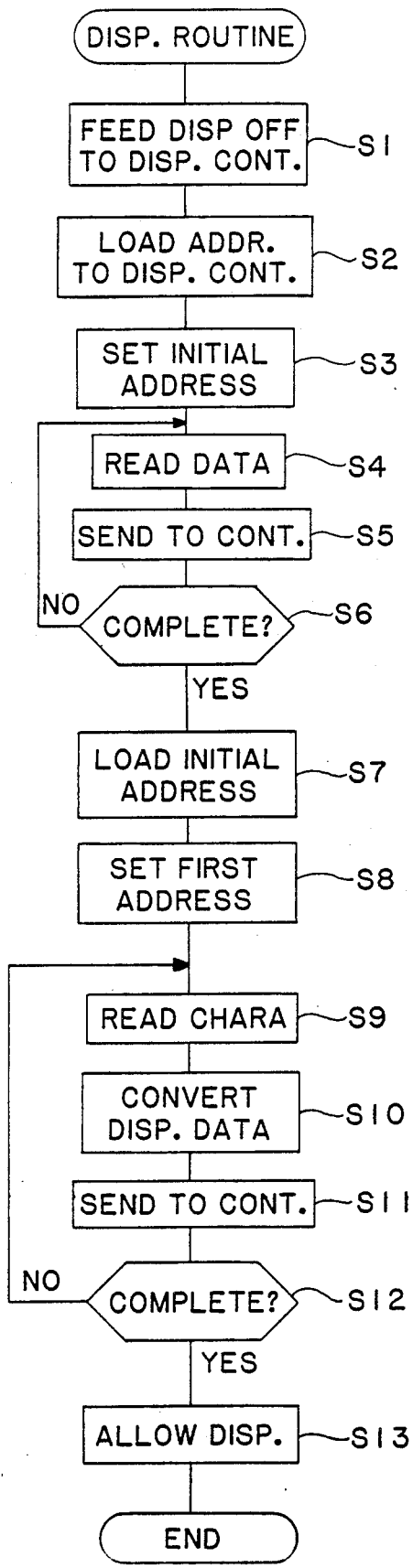
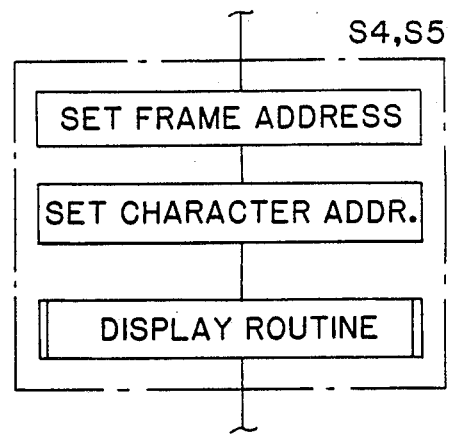

FIG. 11

| INSP. MODE AT START | | | | | | | | | | | | | |
|---|---|---|---|---|---|---|---|---|---|---|---|---|---|
| | | | M | | K1 | K2 | | | | | | | |
| 1. SAFETY INSP. | x | x | x | x | x | ☐ | ☐ | x | x | x | x | x | ☐ | ☐ |
| | x | x | x | x | x | ☐ | ☐ | x | x | x | x | x | ☐ | ☐ |
| 2. MECHA. INSP. | x | x | x | x | x | ☐ | ☐ | x | x | x | x | x | ☐ | ☐ |
| | x | x | x | x | x | ☐ | ☐ | x | x | x | x | x | ☐ | ☐ |
| 3. SPECIAL INSP. | x | x | x | x | x | x | x | x | x | x | x | x | ☐ | ☐ |
| | x | x | x | x | x | x | x | x | x | x | x | | ☐ | ☐ |

RET

FIG. 7A

| DISPLAY MENU | | STATI. |
|---|---|---|
| | INSPECTION | MODE |
| AUTO. MANUAL | CONVEYER | HANDL. (1) |
| ☐ ☐ | DRIVER | HANDL. (2) |
| | HYDRO. | SENS. MON. |
| | ROTARY | TROUBLE INS. |

FIG. 7B

STATISTICS MODE

| ACCM. AMT. | | TOOL 1 | |
|---|---|---|---|
| PROD. AMT. | NUM. OF TROUB. | TOOL 2 | RET |
| RUN TIME | | TOOL 3 | |
| OPER. RATE | | | |

FIG. 7C

SENSOR MONITOR MODE

| SEN. 1 | | SEN. 6 | ▨ | SEN. 11 | |
|---|---|---|---|---|---|
| SEN. 2 | ▨ | SEN. 7 | | SEN. 12 | |
| SEN. 3 | | SEN. 8 | ▨ | SEN. 13 | ▨ |
| SEN. 4 | ▨ | SEN. 9 | | SEN. 14 | ▨ |
| SEN. 5 | | SEN. 10 | | SEN. 15 | ▨ |

RET

STATE — FAILURE RATE

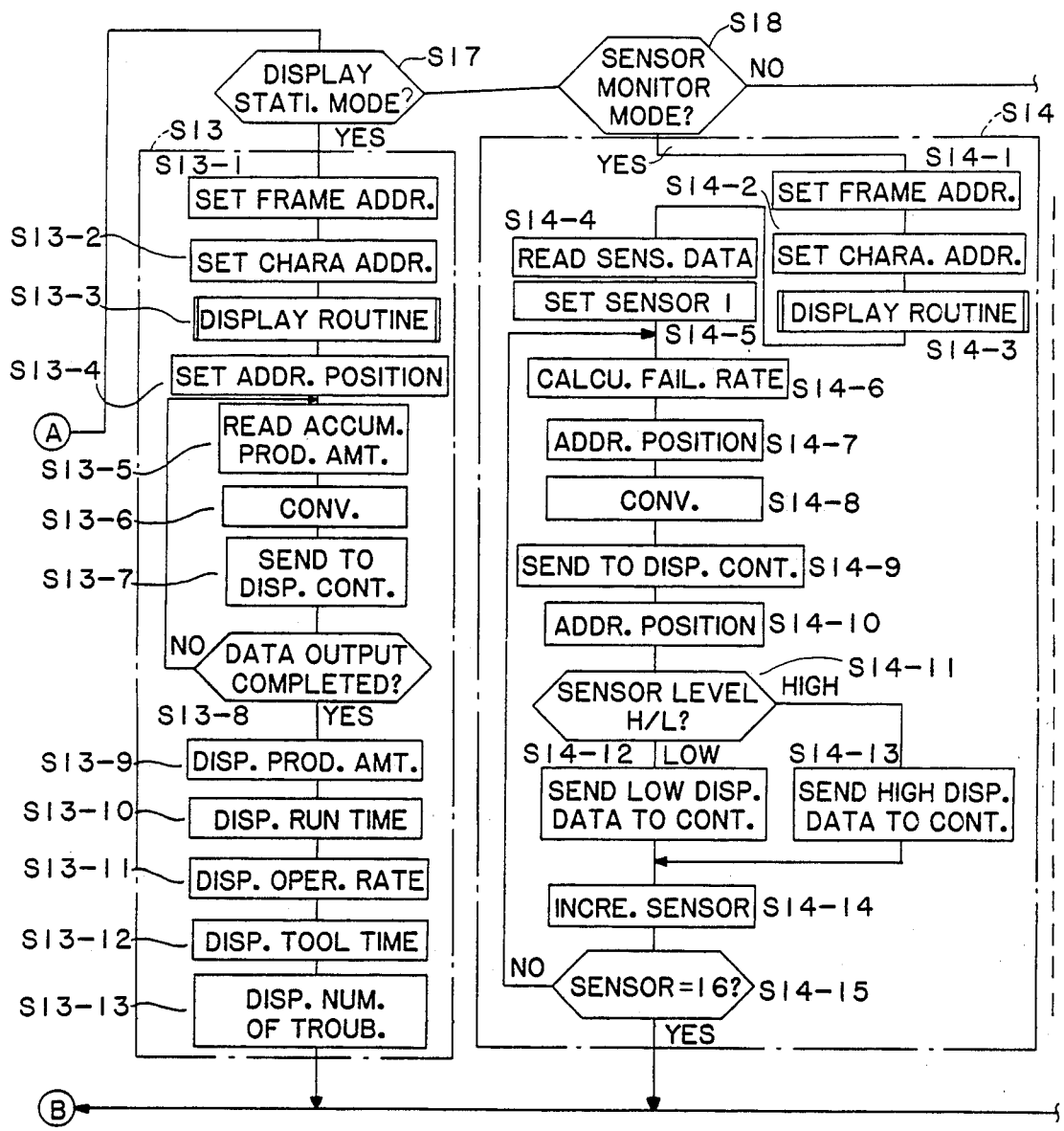

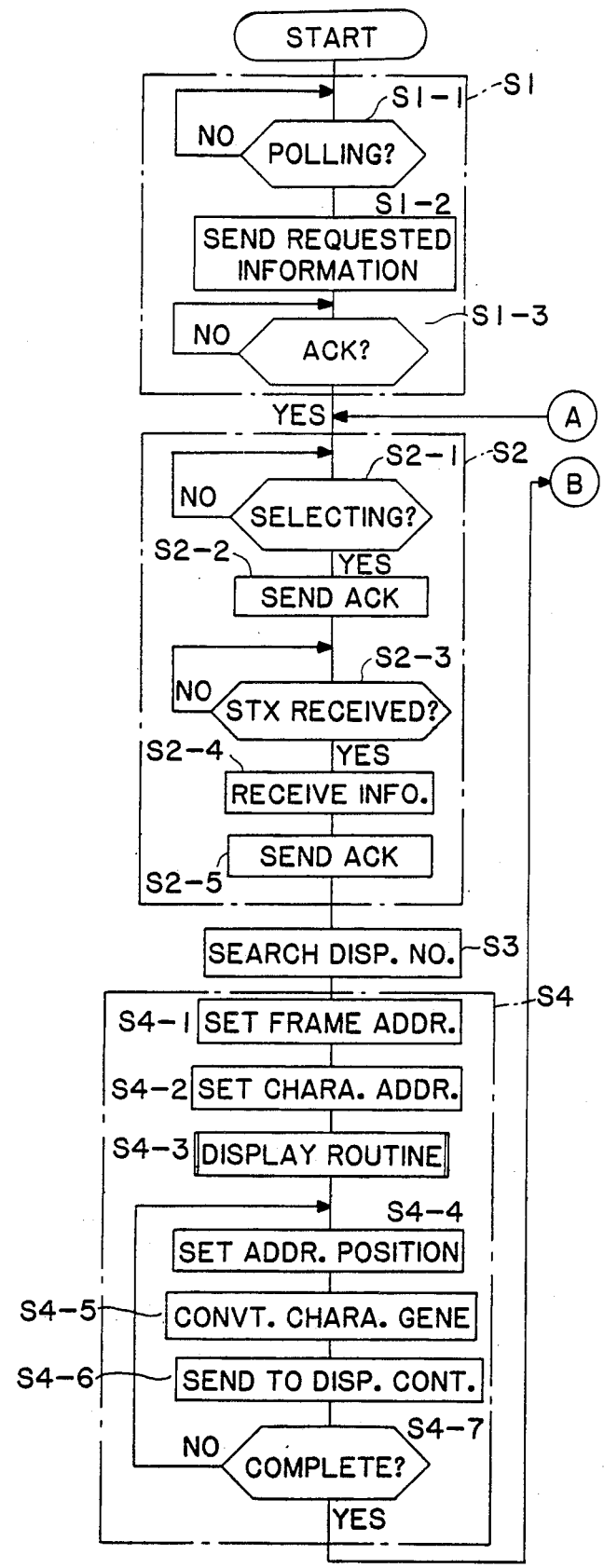

PROGRAMMABLE OPERATOR'S CONSOLE

TECHNICAL FIELD

The present invention relates to a programmable operator's console which is used as the control panel of an apparatus or machine and, more particularly, to a programmable operator's console which comprises a control panel and enables the operator to display information regarding production control over a machine or apparatus on the panel and to communicate with a host computer, e.g., to send information about the production control to the host computer and receive instructions for maintaining or inspecting the machine or apparatus from the host computer and to display the information or instructions.

BACKGROUND ART

FIG. 1 is a perspective view of a conventional operator's console This console is equipped with a number of push-button switches, lights for indicating operations, etc. to enable the operator to control a machine or apparatus. Motors, solenoids, relays, other devices, and functions are assigned respectively to these switches, lamps, etc. For example, one switch is used to control an electric motor. One lamp serves to indicate the operation of the motor.

In this conventional operator's console, as the machine to be controlled becomes more complicated, the number of components of the machine increases. This increases the number of switches, lamps, etc. assigned to the components As a result, the console is made bulky.

As the conventional operator's console is made larger in size, it becomes more expensive to fabricate it. Also, the number of switches, lamps, etc. to be operated increases Therefore, it becomes more difficult to select a switch or lamp to be operated When a trouble or malfunction takes place, the operator must watch the whole large panel to make a judgment as to what should be operated. Hence, the console is not easy to operate As the machine is controlled through the use of the console in a more complex manner, more complex operations are needed and so it takes a longer time to design the console. Consequently, it takes a longer time to manufacture the console.

In recent years, individual machines have tended to be connected with their respective control circuits via wiring using relays Therefore, programming of control functions using a sequencer has prevailed. Although such programming of control functions has been realized programming of operations of the operator's console has not yet been achieved Consequently, the aforementioned problems have not been solved.

Another known operator's console includes a control panel made of a CRT (cathode ray tube) or liquid-crystal display. This console allows the operator to display the functions of lamps, switches, etc. on the panel. When the lamps, switches, and other devices are switched to their other states, the displayed functions are modified accordinglY. Typically, operator's consoles are used with computers and measuring instruments. Where such an operator's console is used in a certain application, such as computer-aided design or workstation, the information displayed on the panel is successively modified as the operator operates the console, so that the single panel is employed in a multiplex manner.

In this kind of operator's console on which the displayed information can be modified, the information capable of being displayed has been previously stored as a program in the memory by the manufacturer and so the user is unable to alter the contents of the memory. Therefore, the operator is not allowed to change the displayed information at will. This limits the degree of freedom with which the operator uses the console. Data indicating operations performed by the operator is input to the CPU of the apparatus. The CPU then controls the apparatus according to the input data Since the data indicating the operations is not directly fed to an external device, the console of this type cannot find wide application. Further, the fundamental functions of the operator's console are not sufficient. In this way, the prior art operator's console has been unsatisfactory.

Where the operator's console is used with a machine or apparatus for example a machine used for machining and assemblying purposes, the console is required to make it easy to operate it. Further, the console is required to collect information about production control from the machine itself and to display the information which is used to manufacture products efficiently, inspect the machine for trouble, appropriately repair it, or maintain it.

However, these various kinds of information about production control which indicate the number of products manufactured, running time, the time for which tools are used, the failure rate, and other factors are numerous and complex. Accordingly, there arise numerous demands for knowledge of these factors Of course, a different kind of information must be collected, depending on the kind of demand.

In order to collect and display such numerous kinds of information concerning production control, the operator's console must be equipped with a number of large and expensive devices, such as accumulators, counters, presettable counters, and a display unit. As a result, the console is rendered large and expensive. Thus, the control panel on the existing operator's console usually does not have the ability to retain and display various kinds of information about a machine or apparatus used for machining and assemblying purposes.

In addition, in order to practically run the controlled machine efficiently, if only operations for display function are improved, then satisfactory results will not be obtained. It is also necessary to take account of the maintenance of the machine itself More specifically, every machine must be appropriately maintained, inspected, and repaired. If tools used on the machine are not replaced with new ones after they are used for a given period, then accurate machining will not be attained. Also, it is necessary to replenish lubricating oil at appropriate timing and to see if tools are worn away excessively.

Of course, techniques for automating the maintenance have improved, but inexpensive sensors capable of detecting subtle wear or decoloration have not been developed. Accordingly, in many cases, the worker is obliged to inspect his machine before or after it is run. However, the practical situation is that the worker foregets to effect the inspection or incompletely carries out the inspection.

DISCLOSURE OF INVENTION

In view of the foregoing, the present invention has been made.

It is an object of the invention to provide a programmable operator's console which comprises a control panel, is economical to fabricate, easy to operate, can be manufactured in a short term, gives a large degree of freedom to the operator in operating the console, and permits the information now being displayed to be directly transmitted to an external device.

It is another object of the invention to provide a programmable operator's console capable of collecting, retaining, and displaying various kinds of information about production control over a machine or apparatus used for machining and assemblying purposes, for example.

It is a further object of the invention to provide a programmable operator's console which can display information about maintenance or inspection, including instructions for operating the machine, on its panel and which, therefore, can appropriately instruct the operator of items of inspection to be carried out.

It is a yet other object of the invention to provide a programmable operator's console which is small in size, economical to fabricate, and easy to operate.

The above objects are achieved in accordance with the teachings of the invention by a programmable operator's console comprising: a central processing unit (CPU) connected via an interface bus with an external apparatus whose operation is under the control of the console; a storage device for storing data about switch items displayed, the CPU acting to read data from the storage device; a display panel which receives the data supplied from the CPU through the internal bus and displays the data as well as the switch items; and physical switches corresponding to the switch items displayed on the panel When any one of the physical switches is switched to its other state, the output signal fed to the CPU from the physical switch acts to switch the frame of information displayed on the panel to another frame of information. Then, the data about this switch is varied and supplied to the external apparatus. The information supplied from the external apparatus is displayed on the panel.

In one embodiment of the programmable operator's console, the CPU consists of a microcomputer system equipped with an input signal acceptance mechanism or switch that directly receives information about production control from a machine used for machining and assemblying purposes, for example Also, a RAM (random-access memory) is provided to store the received information. The frame of information now being displayed on the screen of the console is switched to other frame of information by making use of the programming function so that only desired items of information may be read from the RAM and displayed on the screen. Various kinds of information about production control have been previously stored in the RAM. The information can be transmitted to the external device or a host computer from the microcomputer system when external instructions are given to the console. This enables the external apparatus or host computer to control all of plural machines.

In another embodiment of the programmable operator's console, the console is connected with a host computer via a signal line. The console supplies data about production control over a machine to a host computer. The host computer then creates instructions for maintenance or inspections, based on the data supplied from the console, and sends them to the console. The instructions are displayed on the panel to give the instructions to the operator.

BRIEF DESCRIPTION OF DRAWINGS

FIG. 5(B) is a flowchart for specifically illustrating steps S4 and S5 shown in FIG. 5(A);

FIG. 6 is a flowchart for illustrating a display routine;

FIGS. 7(A)–7(C) are diagrams for illustrating specific examples of information displayed on the transparent touch-sensitive keypad, the information being collected about production control;

FIGS. 10(A) and 10(B) are flowcharts for illustrating a series of operations performed by the microcomputer system 1 shown in FIG. 1 to collect information about production control and display it;

FIG. 11 is a diagram showing one example of information displayed on the panel of a programmable operator's console according to the invention;

FIGS. 12(A) and 12(B) are flowcharts for illustrating an inspection program executed by the microcomputer system incorporated in a programmable operator's console, and in which the program includes steps performed for communication with a host computer Best Mode for Carrying Out the Invention Referring to FIG. 2, there is shown a programmable operator's console embodying the concept of the present invention. This console can be used as a control panel for a machine that machines and assembles parts. This machine comprises sensors for detecting a workpiece, a mechanism for conveying the workpiece, and various machining mechanisms for machining the workpiece. During the operation of the machine, the workpiece is first detected by the sensors and then conveyed by the conveying mechanism. Subsequently, the workpiece is machined by the machining mechanisms to complete a product The machine is further equipped with a control apparatus to permit the operator to operate the control panel so that the conditions of the sensors or stepwise movement of the workpiece made by the driving mechanism may be displayed when a trouble takes place, for stopping or readjusting the operation of the machine.

Figure 2:
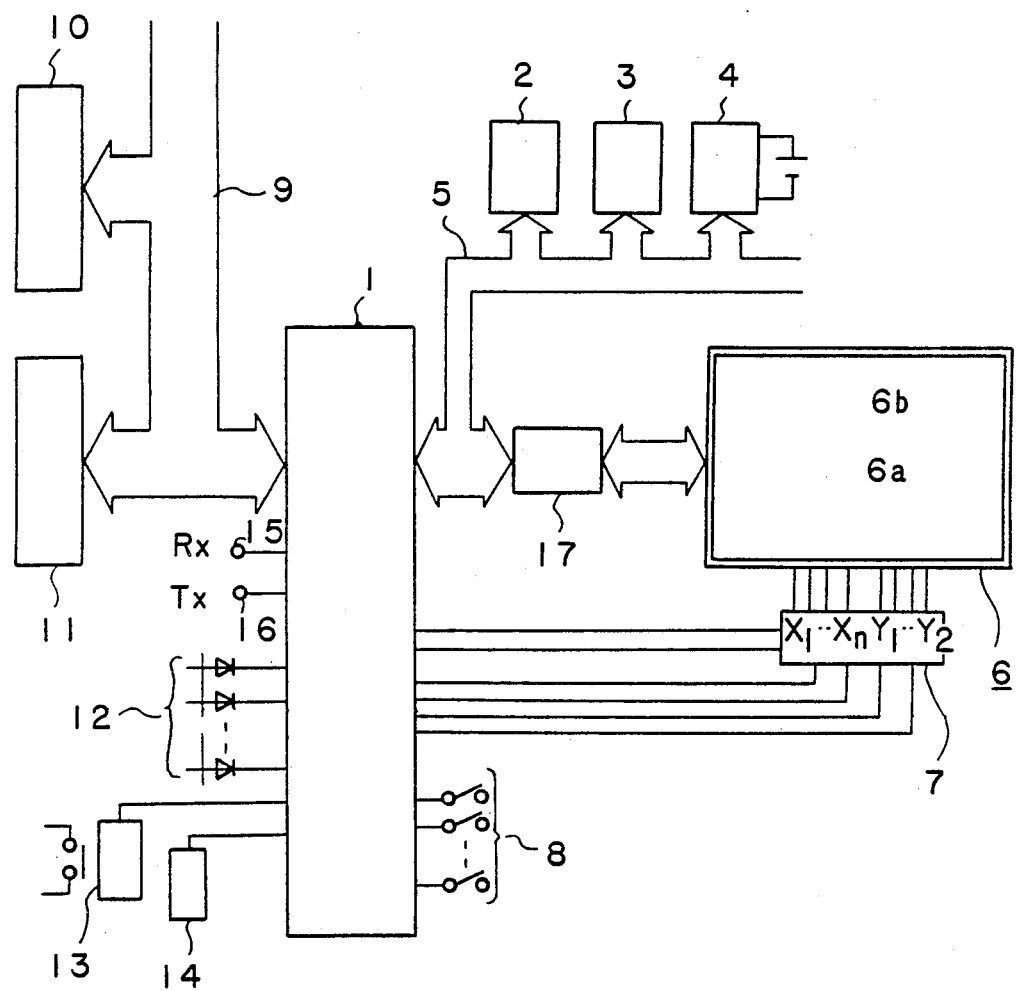
FIG. 2 is a block diagram of an operator's console according to the invention.

Referring still to FIG. 2, a microcomputer system 1 comprising a central processing unit (CPU) which takes the form of a single LSI chip of 8 bits, for example. A microcomputer manufactured by NEC Ltd., Japan under the product name of $\mu$PD7810 can be used for this purpose. A character generator 2 produces characters to be displayed.

A memory 3 consisting of an E²PROM (electrically erasable PROM) stores graphical data displayed on a screen. Instead of using the character generator 2, characters may be stored in the memory 3 as graphical data. Another memory 4 consists of a RAM and stores numerical data to be displayed on the screen. Every frame of information displayed on the whole screen for indicating the condition of the operating machine is stored in the memory 4 to facilitate restarting the machine after the power supply is turned off. To prevent the contents of the memory 4 from being destroyed, it is backed up by battery-power supplies. Indicated by numeral 5 is an internal bus. A transparent touch-sensitive keypad 6 comprises a display panel 6b (not shown in FIG. 2) and transparent switches 6a (not shown in FIG. 2). A liquid-crystal display manufactured by Seiko Epson Ltd., Japan, under the product name of EG4401 can be used as the display panel 6b. Data is loaded into a display controller 17 from the microcomputer system 1 to display the data A liquid-crystal controller that is manufactured by Seiko Epson Ltd., Japan under the product name of E-13330 can be used as the controller 17. Of course, the controller 17 is equipped with a video RAM.

The transparent switches 6a are located under the display panel 6b and displayed on the panel via a transparent sheet When. the operator touches one switch displayed on the panel, the corresponding physical switch 6a produces an output signal The transparent touch-sensitive keypad 6 is of the known structure.

A key encoder 7 receives the output signal from the actuated transparent switch 6a, encodes the signal, and sends the produced data to he microcomputer system 1. Switches 8 are operated by the operator. Indicated by numeral 9 is an interface bus. A loader 10 receives data to create one frame of information displayed and sets up an executable program A sequencer 11 is connected with an external machine (not shown), in this case a machine used for machining and assemblying purposes. The sequence in which the machine runs is controlled by the sequencer 11. This sequencer 11 acts to issue instructions to the microcomputer system 1 to fetch data selectively from the memory 4. When some of the switches 6a and 8 are actuated, data indicating the actuation is fed to the sequencer 11 via the key encoder 7 and the microcomputer system 1. Then, the sequencer 11 issues instructions to the machine connected with the sequencer according to the input data, in order to operate the machine. Also, the sequencer 11 serves to give instructions to the microcomputer system 1 to switch the frame of information displayed on the panel 6b to another frame of information.

Display lamps 12 are disposed near the transparent touch-sensitive keypad 6 of the operator's console. If the display panel 6b of the keypad 6 consists of a liquid-crystal display or fluorescent character display tube, then it is difficult to see the lamps 12 from a remote location or under bright condition. Accordingly, a large-sized alarming lamp is used as each display lamp 12, and the lamps 12 are designed to be lit up separately under the control of the microcomputer system 1. Characters indicating the usage of each lamp 12 or other information are displayed on the panel 6b at locations close to the lamp 12. Since the characters can be easily changed according to the instructions issued by the microcomputer system 1, each display lamp 12 can be switched between several functions. When a trouble takes place, warning relays 13 and a buzzer 14 operate and inform the outside person of this fact.

Some (not shown) of the switches operated by the operator may be disposed instead of the display lamps. In this case, the switches can be switched among several functions in the same way as the transparent switches by modifying character data corresponding to the switches similarly to the display lamps.

The manner in which the display lamps 12, the warning relay 13, the buzzer 14, and the characters on the side of the display lamps 12 operate or light up is specified by the program in the sequencer 11. These operations are controlled by the microcomputer system 1 which receives instructions via the interface bus 9. When the touch-sensitive keypad 6 is depressed, the depression is detected, and the buzzer 14 is caused to sound in a short time to inform the operator of the depression.

Figures 3, 4A, 4B:
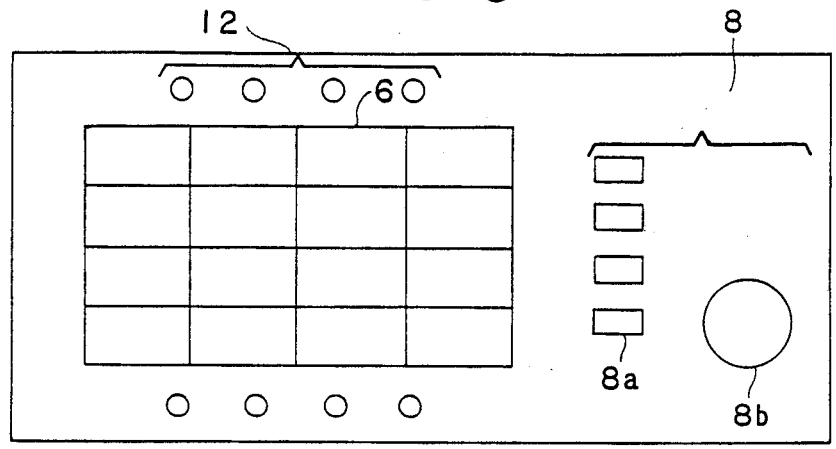
FIG. 3 is a front elevation of main portions of the console shown in FIG. 2 for showing a display panel.
FIGS. 4(A) and 4(B) are diagrams for illustrating specific examples of the transparent touch-sensitive keypad 6 shown in FIG. 3.

FIG. 3 is a front elevation of the programmable operator's console, for showing its face. It is to be noted that like components are indicated by like reference numerals throughout all the figures. In this specific example, the transparent touch-sensitive keypad 6 is divided into 16 sections and so it contains 16 switch elements and corresponding characters. Some of these sections can be used as the display lamps 12. As an example, the switches 8 comprise a number of switches 8a to which certain functions are assigned and a large emergency stop switch 8b.

The arrangement of switches displayed on the panel 6b of the keypad 6 changes whenever the frame of data displayed on the whole panel is switched to other frame of data. Therefore, in case of emergency it is difficult for the operator to operate the switches. For this reason, the large emergency stop switch 8b or other similar switch is disposed outside the panel 6b. In case of emergency, the operator can quickly operate this large switch.

The switches 8a may include function-specifying switches used when the programmable operator's console are tested for its functions, specifying switches for registering something, or other special-purpose switches.

FIGS. 4(A) and 4(B) show specific examples of information displayed on the whole touch-sensitive keypad 6 shown in FIG. 3.

FIG. 4(A) shows one example of all the information displayed on the whole keypad 6 when the power supply of the machining-and-assemblying machine connected with the sequencer 11 is turned on. Displayed on the screen are "Menu", or a displayed list from which a choice can be made, "Production Amount" and other ten items included in frames. These ten items include "Automatic Operation", "Manual Operation", "Conveyor", "Driver", and "Inspection" for trouble. The "Conveyor", "Driver", "Inspection", etc. are used when the console is placed in inspection mode. These ten frames constitute switches.

It is now assumed that the operator touches the switch designated "Conveyor" on his or her finger. The produced signal is sent to the sequencer 11 via the key encoder 7 and the microcomputer system 1. Then, the sequencer 11 supplies a signal for selecting the data used for inspecting the conveyor to the microcomputer system 1.

Upon receiving the signal for selecting the data, the microcomputer system 1 creates one frame of information as shown in FIG. 4(B) displayed on the touch-sensitive keypad 6, using the character generator 2 and the memory 3. As a result, as can be seen from FIG. 4(B), new various switches necessary for the conveyor inspection mode are created. Then, the operator operates these new switches to drive components of the machine.

When two frames, or switches, designated "Solenoid (1)" and "Solenoid (2)", respectively, are depressed, for example, actual physical solenoids (1) and (2) (not shown) can be energized simultaneously. When the operator desires to select another frame of data displayed on the panel, the key designated "RET" is depressed. Then, the information shown in FIG. 4(A) is regained, after which a desired switch is depressed.

Since the novel programmable operator's console is designed as described above, ten frames of information, including "Automatic Run", "Manual Run", and the 8 inspection modes, can be displayed on the panel. If each frame of information has 12 keys on the average, then 120 keys can be used in total. This is equivalent in function to an operator's console having 120 keys on its face.

Where as many as 120 keys are disposed on one face, it is not easy to correctly select one out of them. In the novel console, only those switches which are related to one application are displayed on the screen and, therefore, it is easy to make a selection without error. Hence, the console can be operated with great ease. Also, the console can be easily designed to facilitate selection.

In FIG. 4(B), $S_1$ through $S_8$ indicate either the conditions of the outputs from eight sensors or the conditions of their operations, respectively. These sensors are mounted on the machine.

Figure 5A:
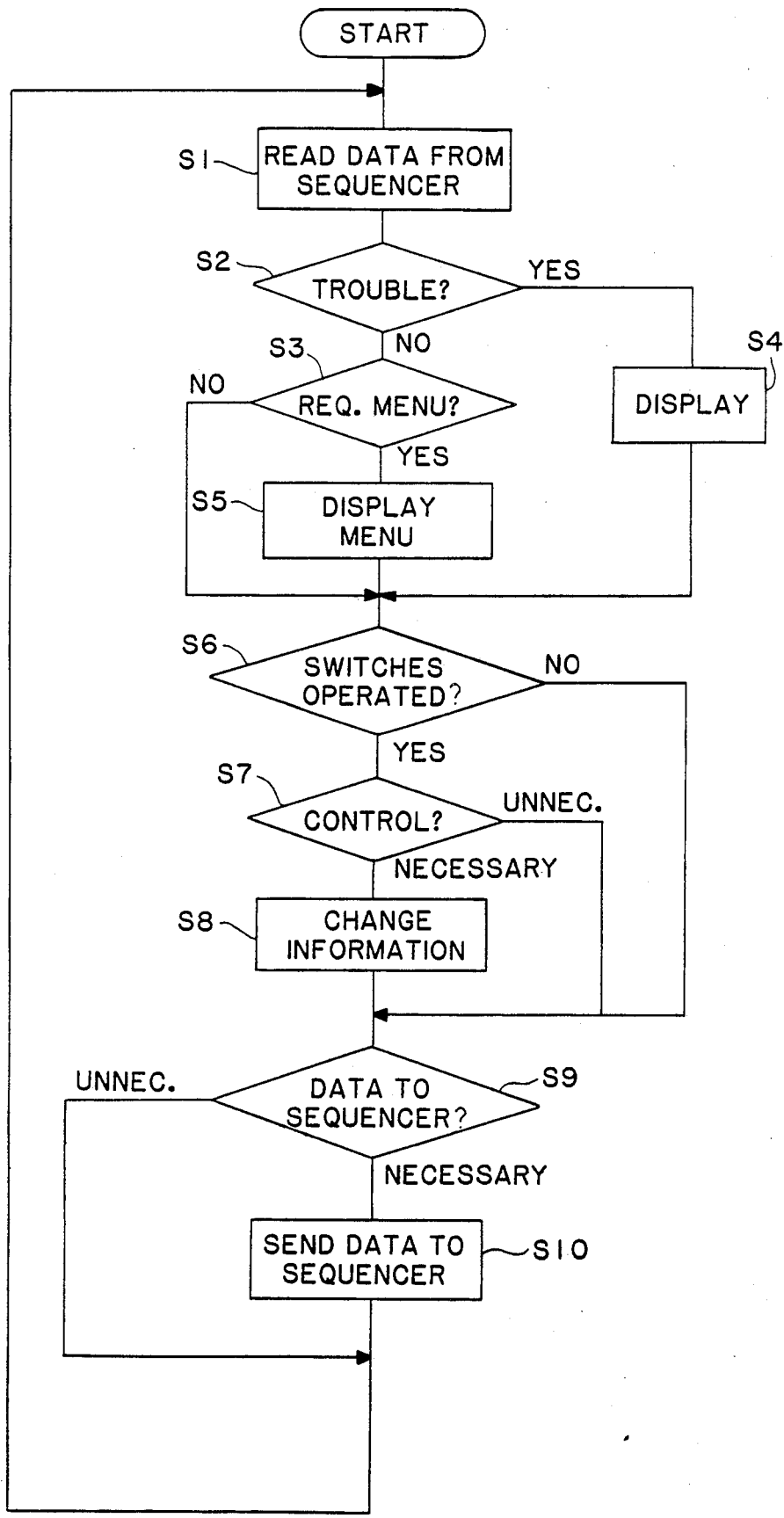
FIG. 5(A) is a flowchart for illustrating one example of a series of operations performed by a microcomputer system to control the data displayed.

FIG. 5 is a flowchart for illustrating one example of a series of operations performed by the microcomputer system 1 shown in FIG. 2 to modify the frame of information displayed on the display panel 6b, or the transparent touch-sensitive keypad 6. This flowchart illustrated in FIG. 5 is now described while also referring to FIGS. 2–4. When the microcomputer system 1 is set into operation, a general initial program for operating the microcomputer system is run. Then, control enters the program illustrated in FIG. 5 for controlling the information displayed on the panel.

Data is loaded into the microcomputer system 1 from the sequencer 11 via the interface bus 9 (step Sl). If the data indicates that the machine (not shown) connected with the sequencer 11 has broken down (step S2), then the trouble inspection modes (FIG. 4(A)) are displayed (step S4). In step S4, the displayed frames (FIG. 4(A)) and the addresses of the first ones of the displayed characters are loaded into a display frame address memory and a display character address memory, respectively, which are used in a display routine If no trouble is found, control proceeds to step S3, where a decision is made to see if the menu is requested.

Of course, the menu is requested when one frame of information displayed is first created. Also, when the original information displayed (FIG. 4(A)) is restored after the switch designated "RET" on the panel is depressed, the menu is requested. Therefore, the result of the decision is YES. Thus, control goes to step S5, where the menu is displayed on the panel as shown in FIG. 4(A).

If one of the transparent switches 6a on the panel excluding the key designated "RET" or one of the switches 8 shown in FIG. 2 is depressed (step S6), the information displayed is modified and, at the same time, data is transmitted to the sequencer 11 (steps S8, S9, S10).

The sequencer 11 accepts the incoming data, controls the operation of the machine, and supplies data indicating the result to the operator's console, or the display panel 6b, via the microcomputer system 1. At this time, information is displayed on one portion of the display panel and so an instruction for ceasing display is not sent to the display controller 17. Data about display is read from the $E^2PROM$, depending on the data from the sequencer 11 Then, addresses of the positions of displayed information are routed to the display controller 17, followed by writing of the displayed data. That is, the output from the sequencer 11 is read into the microcomputer system 1 in the same manner as in step Sl Subsequently, these operations are repeated to control the operation of the machine.

The display routine shown in FIG. 5(B) is now described. This routine is associated with step S4 for displaying the trouble inspection modes and also with the step S5 for displaying the menu. FIG. 6 illustrates the flowchart of the display routine, which is carried out to display the data on the panel 6b, the data having been previously loaded in the programmable operator's console by the loader 10.

First, the information displayed on the panel 6b is caused to go out (step Sl). Addresses are loaded into the video RAM of the display controller 17 (step S2). The initial address of the frame data loaded in the controller 17, i.e., the address stored in the $E^2PROM$ 3, is set (step S3). Data is successively read out from the address set in step S3 (step S4), and is output to the controller 17 (step S5). Then, a decision is made to determine whether the data about the display frames has been fully loaded into the controller 17 (step S6). If this operation is not complete, then control returns to step S4, where data about displayed information is read out successively and sent to the display controller 17 as mentioned already.

The address at which writing of character data into the video RAM is initiated is sent to the display controller 17 to display characters on the display panel 6b (step S7). The first address of the character data written to the controller 17 is set (step S8). Steps S9-S12 constitute a routine for successively writing character data to the display controller 17. Data about displayed characters are read out (step S9). The character generator converts data into a displayed form (step S10), which is then fed to the controller 17 (step Sll). A decision is made to ascertain whether the character data has been fully loaded into the display controller (step S12) If this loading is not complete, then control returns to step S9, and then the aforementioned steps are repeated.

An instruction for allowing display on the panel is given to the display controller 17 (step S13). The contents of the video RAM of the controller 17 are displayed on the display panel (steps S1-S12)

The manner in which information concerning production control is collected from the machine (not shown) connected with the sequencer 11 is next described by referring again to FIG. 2. When the machine is running, some of the switches 8 closes, producing signals. Whenever the machine manufactures one product, another portion of the switches 8 closes, producing signals. Each time one breakdown occurs, a further portion of the switches 8 sends out data indicating the number assigned to the breakdown in serial or parallel form. A yet other portion of the switches 8 produces data in serial or parallel form to indicate the numbers assigned to tools. The microcomputer system 1 accepts these signals and data every given period, say 10 ms. The total running time is calculated, based on the accepted data. Also, the amount of production is calculated. The data obtained in this way about production control is stored in the RAM 4.

When the value of any one item of the data about production control reaches its limit value, the warming relay 13 is actuated to inform the outside person of this fact. A means for setting such a limit value can be the keyboard of an ordinary system, for example the loader 10 shown in FIG. 2.

FIGS. 7(A)–7(C) show examples of collected production control information displayed on the display panel 6b, or the transparent touch-sensitive keypad 6.

Figure 1:
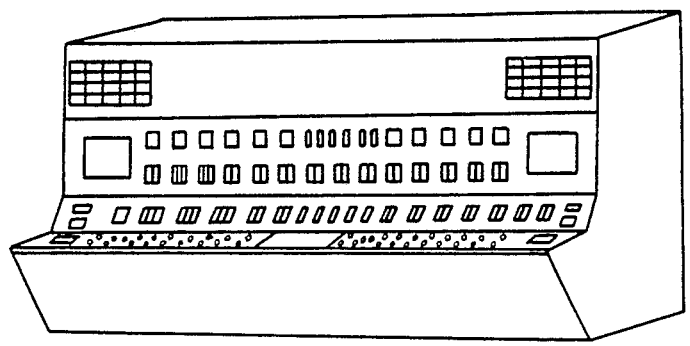
FIG. 1 is a perspective view of a conventional operator's console.

FIG. 7(A) shows the displayed information when the displayed information selection mode is selected. In this case, the switches designated "Production Stat." and "Sensor Monitor" are used. If the transparent switch designated "Production Stat." is depressed, the produced signal is detected by the microcomputer system 1 shown in FIG. 1. Then, the microcomputer system 1 displays an already created frame of information on the panel 6b, using the character generator 2 and the memory 3.

The displayed information about production control is shown in FIG. 7(B), and consists of statistical data including the amounts of production of various kinds of products, the running time required for production, the operation rate, the time for which tools are used, and the number of tools. The information is stored in the RAM 4 shown in FIG. 2.

Similarly, if the switch designated "Sensor Monitor" as shown in FIG. 7(A) is depressed, then a frame of information used in the sensor monitor mode is displayed as shown in FIG. 7(C). As this time, the conditions of operations of the sensors themselves, the number of failures per unit running time, and other factors are indicated. This enables the operator to recognize the conditions of the operating sensors at a glance. Further, the operator can know the failure rate. Hence, the operator can maintain the machine adequately.

Figure 8:
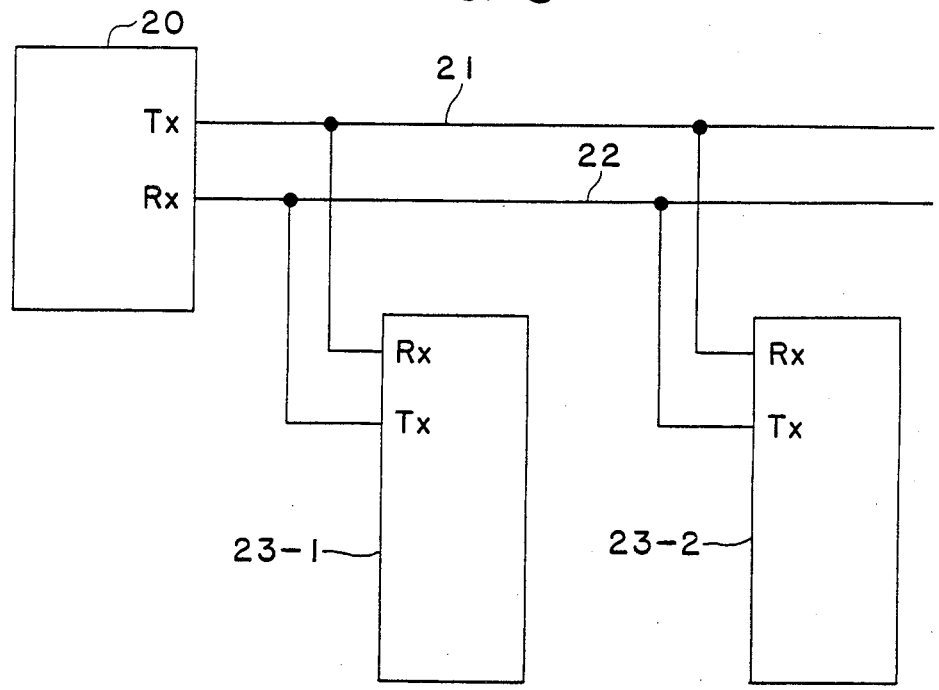
FIG. 8 is a block diagram of a programmable operator's console according to the invention, and in which the console is connected with a host computer.

FIG. 8 is a block diagram of the programmable operator's console, and in which the console is connected with a host computer The host computer, indicated by numeral 20, has a transmitting signal line 21 and a receiving signal line 22 which are connected with one or more programmable operator's consoles 23-1, 23-2 via a transmitting port $T_x$ and a receiving port $R_x$, respectively.

Referring back to FIG. 2, communication ports $R_x$ and $T_x$ are connected with the microcomputer system 1. In particular, $R_x$(15) is a port at which data from the host computer is received. $T_x$(16) is a port at which data is transmitted to the host computer Data can be transmitted between the host computer 20 and the operator's consoles 23-1, 23-2 in a known sequence, for example the fundamental sequence of data transmission of JIS (Japanese Industrial Standard) C6362.

Figure 9A:
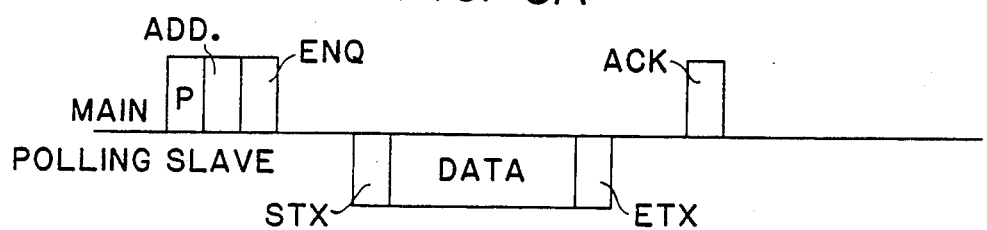
FIGS. 9(a) and (b) is a diagram for illustrating one way in which a communication is made between the console and the host computer shown in FIG. 8.

FIG. 9 shows one example of sequence in which data is transmitted. A different address is assigned to each programmable operator's console. It is assumed that the host computer is a master station and that the consoles are slave stations. FIG. 9(a) shows the case of polling. When the master station requests (ENQ) one slave station, or programmable operator's console, to transmit data to the master station, the slave station transmits data held in the slave station. STX indicates the beginning of a text. ETX denotes the end of the text. The data is either the statistical data about production as already described in connection with FIG. 7 or data associated with sensors. The slave station transmits all or a part of the data, depending on the need of the system. ACK indicates an acknowledge.

Figure 9B:
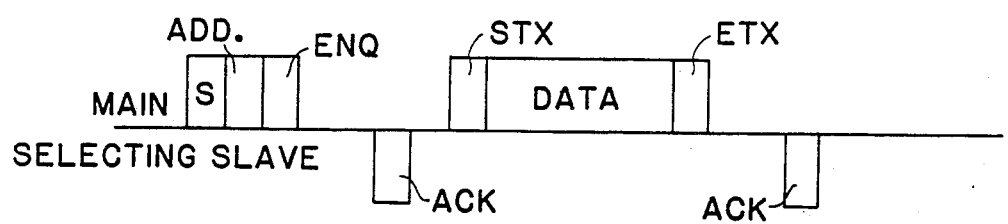

FIG. 9(b) shows the sequence in which a selection (S) is made when the master station, or host computer, transmits data. In this way, each programmable operator's console is capable of transmitting data held in it to the host computer and, therefore, the statistical data about the production effected in the whole plant, i.e., by the whole machine, can be managed. Consequently, the whole plant can be managed by an efficient manage system.

Figure 10A:
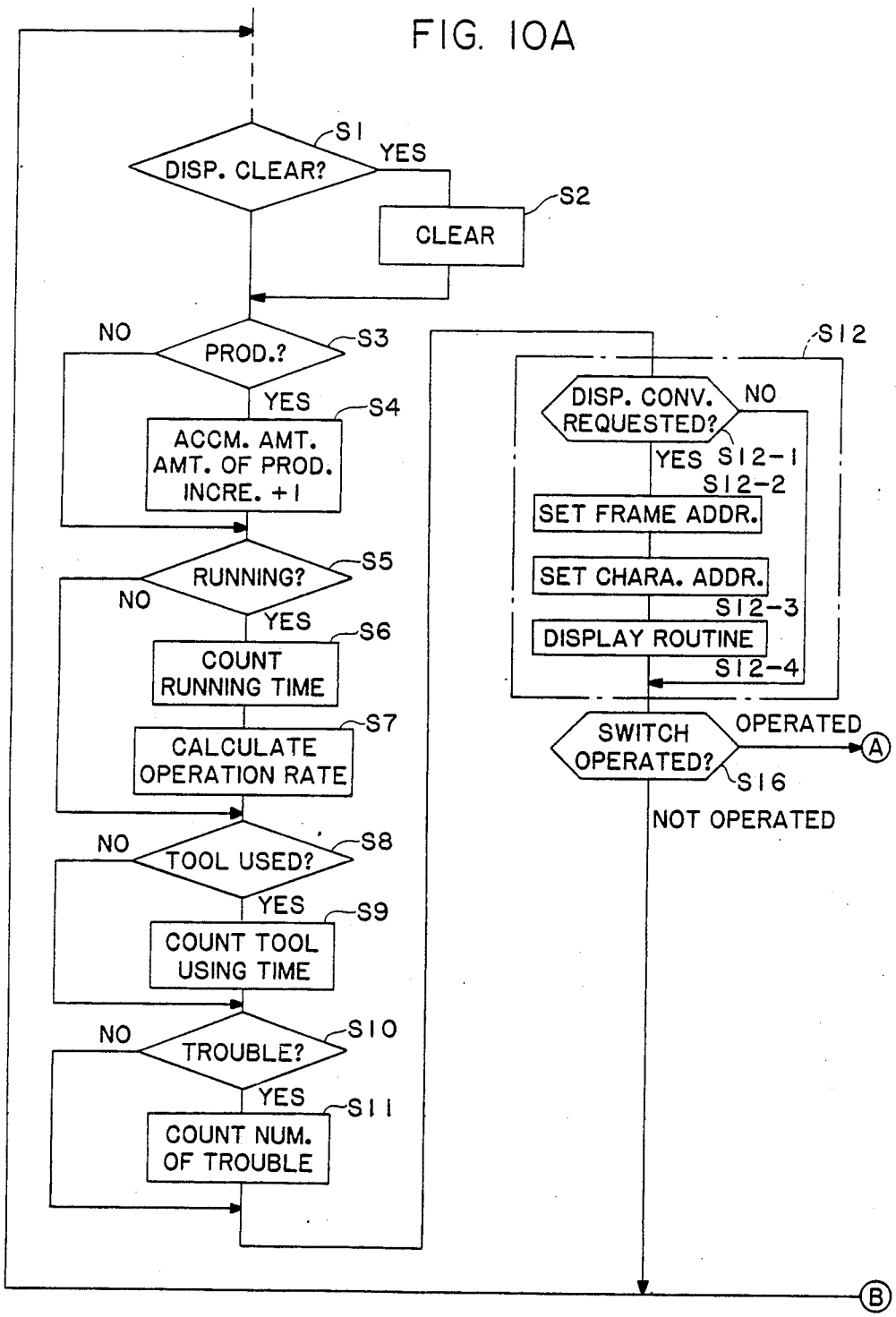

FIG. 10(A) and 10(B) are flowcharts for illustrating a series of operations performed by the microcomputer system 1 shown in FIG. 2 to collect and display information about production control FIG. 10(A) illustrates steps S1–S12 and S16. FIG. 10(B) illustrates steps S13–S14 and S17–S18.

One item of the information about production control is the amount of production achieved every day. This and other data items are cleared every day. Another item of the information indicates a tool. This item is cleared whenever the tool is replaced, independent of day or time. A decision is made to see whether there is a request for clearance of the displayed data items (step Sl). If there is such a request, then the requested data item are cleared (step S2).

Then, control goes to steps S3 and S4, where the contents of memories for storing the accumulative production amount and the amount of production achieved every day, respectively, are incremented whenever one product is manufactured. These memories are held in the RAM 4 shown in FIG. 2, and the data stored in them is backed up by battery power supplies.

Control then proceeds to step S5, where a decision is made to see whether the machine is running. If so, the running time is counted up every minute, for example (step S6). The operation rate is calculated from the following formula:

Operation Rate=(Progress Time/Working Time)×100 (step S7). A decision is made to see if tools are used (step S8). The time for which each tool is used is measured (step S9), and data indicating this time is stored in a memory. A decision is made to determine whether troubles have taken place (step S10). If so, the number of troubles is counted (step Sll). The number of troubles may be counted either for each individual cause or without discriminating among different causes. Thus, data about production control is collected while the programmable operator's console controls the machine.

When there arises a demand for change of the information presently displayed on the panel, the frame of information shown in FIG. 7(A) is selected and displayed as described previously (step S12). A decision is made to determine whether a change of the information now being displayed is requested, i.e., whether the key designated "RET" has been depressed (step S12-1). If it is requested, control goes to step S12-2, where the first address of the displayed frame is set. Then, the first address of the displayed characters is set (step S12-3). The information shown in FIG. 7(A) is displayed on the display panel 6b in accordance with the display routine (step S12-4).

A decision is made to see whether one of the transparent switches 6a has been depressed, i.e., whether any one item of the information displayed has been selected (step S16). If it is depressed, then control proceeds to step S17, where a decision is made to ascertain whether the statistical data display mode has been selected. If so, control proceeds to step S13-1. If not so, control goes to step S18, where a decision is made to see if the sensor display mode has been selected. If so, control goes to step S14-1. The frames, the accumulative amount of production, the amount of product, etc., shown in FIG. 7(B) are displayed on the panel (steps S13-1 to S13-3). Steps S13-4 to S13-8 constitute a routine for displaying the accumulative amount of production. The addresses at which characters are displayed are first loaded into the display controller 17. Data about the accumulative amount of production is read from the memory (step S13-5), the data having been written to the memory in step S4. The data is encoded into the form suitable for display (step S13-6), and supplied to the display controller 17 (step S13-7). A decision is made to determine whether the accumulative production amount data that was read out is sufficient to attain the number of digits displayed (step S13-8). If it is not sufficient, control goes back to step S13-5, and the aforementioned steps are repeated. Steps S13-9, S13-10, S13-11, S13-12, S13—13 are carried out in the same manner as the above-described steps S13-4 to S13-8. Step S13 9 is effected to display the amount of production. Step S13-10 is carried out to display the running time. Step S13 11 is performed to display the operation rate. Steps S13-12 is done to display the periods for which tools are used. Step S13—13 is executed to display the number of troubles.

The frames and the names of sensors shown in FIG. 7(C) are displayed on the panel (steps S14-1 to S14-3). Data about the sensors is read from the sequencer 11 (step S14-4). The data about the sensors is successively displayed on the panel from the sensor 1 (steps S14-5 to S14-15). First, the sensor 1 is selected (step S14-5). The failure rate is calculated using the formula Failure Rate=(Accumulative Failure Time/Accumulative Operation Time)×100 from the accumulative operation time and the accumulative running time which were stored in step S14-6. The positions at which characters are displayed are loaded into the display controller 17 to display the failure rate calculated in step S14-6 on the display panel 6 (step S14-7). The failure rate is encoded into the form adapted for display (step S14 8) and fed to the controller 17 (step 14-9).

The addresses at which characters are displayed are loaded into the display controller 17 to display the condition of a sensor (step S14 10). A decision is made to determine whether the level of the data read out in step S14-4 is high or low (step S14-11). If it is high, data indicating the high condition is supplied to the controller 17 (step S14-13). If it is low, then data indicating the low condition is furnished to the controller 17 (step S14-12). The code indicating a sensor is incremented to display the data on the next sensor (step S14—14). A decision is made to see if the data about all the sensors is fully displayed (step S14-15). If it is not so, then control returns to step S14-6, and the above-described steps are repeated.

Besides collecting and storing information about production control, the information is sent to the host computer which receives requisite information about inspection at good timing and displays it on the display panel in the manner described below. Of course, machines (not shown) which are controlled are connected with the programmable operator's consoles 23-1 and 23-2 shown in FIG. 8.

The host computer performs given arithmetic operations, based on the various kinds of information about production control sent from the operator's consoles. Then, the host computer creates additional items to be inspected whenever the machine is run for a certain period, and routes them to the consoles. For example, the inspected items include measurement of the amount of wear every 1000 hours of operation, inspection made to see whether the part is replaced every 3000 hours of operation, and a check made to ascertain whether the cutting tool is replaced every 100 hours of operation.

Generally, at the beginning of work in a factory, safety inspections for ascertaining safety around the working stations, inspections for machines, e.g., the amount of lubricating oil, looseness, and decoloration, and special inspections for items particularly specified are made. At the end of work, similar inspections are made. In addition, the data obtained by the inspections is usually recorded and sorted.

Before starting the machines placed in the working stations in such a plant, the host computer transmits requisite items of inspection to the operator's console via communication lines and causes the consoles to display them.

FIG. 11 shows one example of one frame of information displayed on the display panel of each programmable operator's console as described above. M is a sentence for illustrating one item of inspection for safety. A transparent switch K1 is depressed when no problem is found by the inspection. Another transparent switch K2 is depressed when a trouble is found by the inspection, in which case a countermeasure is taken and it is necessary, of course, to record the details of the trouble. After the completion of the inspection, the key designated "RET" is operated. If the inspection item overflows one frame of information, then the information displayed is updated after the completion of the inspection corresponding to the single frame of information displayed. Thus, a new item of inspection is displayed. If the key designated "RET" is depressed before the completion of the inspection, then the operator's console supplies the information about the incompletely inspected item to the host computer, which will then find that the important item is left unchecked. Thereafter, the host computer instructs the console to make the inspection again and display this instruction.

After completing the inspection, if the key designated "RET" is depressed, then the information in the menu mode shown in FIG. 7(A) is displayed. Under this condition, the machine can be started.

The inspections made at the beginning of work have been described by way of example Inspections made at the end of work can be displayed in a similar manner. Because the host computer can transmit instructions to the machine operator at any time over the transmission lines, the panels of the programmable operator's consoles can be used as remote display units of the host computer.

Each programmable operator's console designs a frame of information to be displayed on the display panel and stores data about the design in its ROM or other memory. The host computer transmits the instruction M shown in FIG. 11 to the console. The characters indicating the instruction are put in the frame created according to the data on the panel. This is advantageous in that the amount of data transmitted is small. For this purpose, the host computer sends data indicative of the number assigned to the frame of information displayed as well as the instruction to the console. This console creates a frame of information displayed from these kinds of data.

FIG. 8 shows one example of the case in which the host computer is connected with plural programmable operator's consoles. If there is a 1:1 relationship between the host computer and each display, then the loader 10 and the sequencer 11 can be connected to the host computer via the interface bus 9 as shown in the block diagram of FIG. 2. This dispenses with any special communication line in connecting the host computer with the operator's consoles.

Figure 12B:
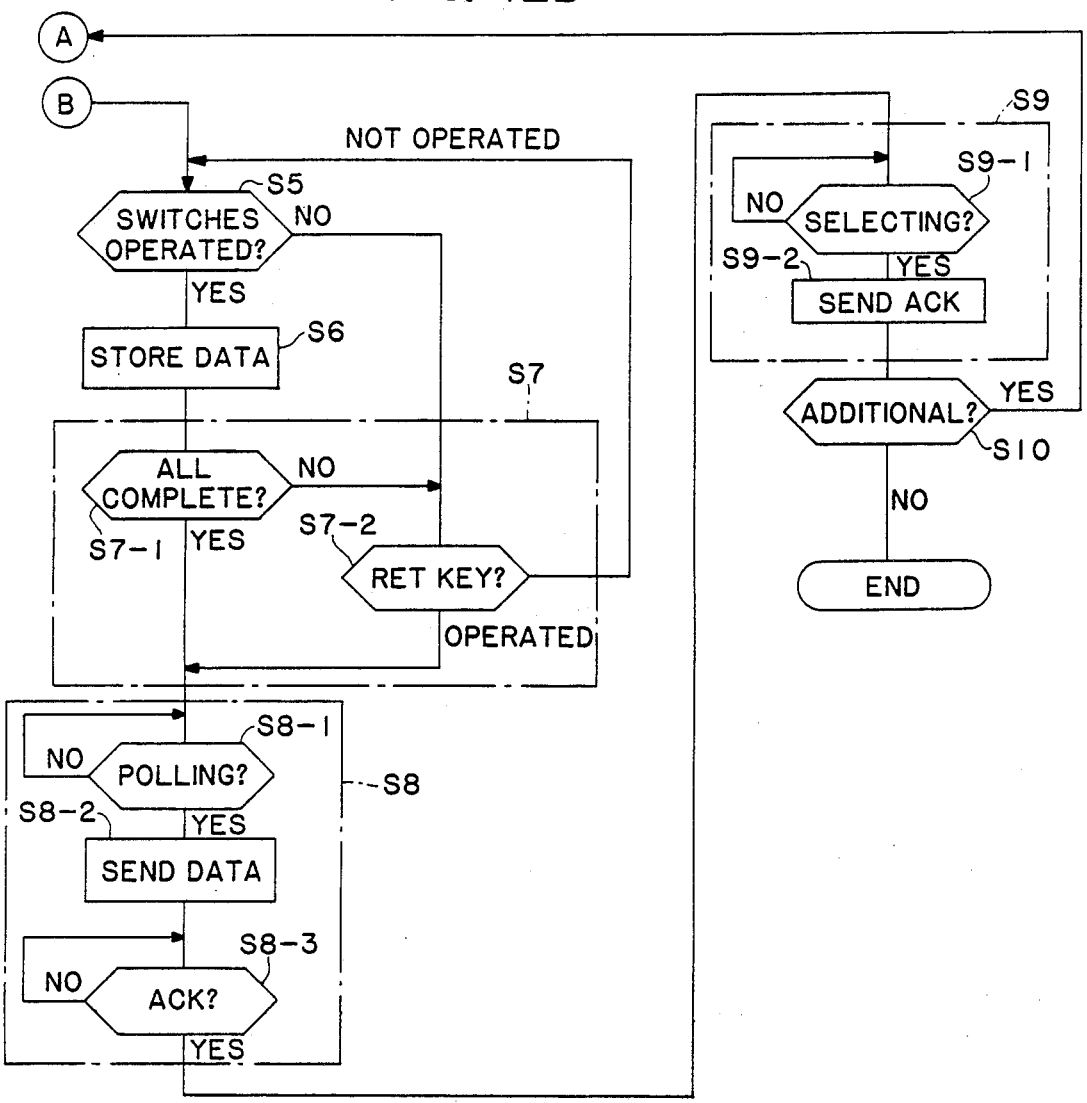

FIGS. 12(A) and 12(b) are flowcharts illustrating a series of operations performed by the microcomputer system 1 (FIG. 2) of the console 23-1, for example, shown in FIG. 8 to execute a program for inspections. Communications with the host computer 20 are included in these operations. Steps S1 to S4 are shown in FIG. 12(A). Steps S5 to S10 are shown in FIG. 12(B).

When the power of one programmable operator's console is turned on and the operation of the machine is started, an instruction for requesting information about inspection is sent to the host computer from the console via the communication line (step Sl). The transmission is made in accordance with the procedure shown in FIG. 9(a). A decision is made to determine whether the host computer is polling the consoles (step Sl-1). If so, an instruction for requesting for information about inspection is transmitted (step Sl 2). When the corresponding acknowledgment signal is received, the process is ended (step S1-3). When the host computer receives this instruction, or when it judges it necessary to send information about inspection based on the data stored in itself, including information about production control, the computer transmits the information to the console.

If the information about inspection is received (step S2), transmission is made in accordance with the procedure shown in FIG. 9(b). If a selection signal is received (step S2-1), then an acknowledgment signal is transmitted (step S2-2). This informs the host computer that the console can receive data. The console is ready to receive STX that is the initial character of data (step S2-3). If it is received, information about inspection is received (step S2-4). The console then transmits an acknowledgement signal to the host computer to inform it of the reception (step S2-5). The console reads data from the memory 3 (FIG. 2) according to the data about the number assigned to the frame of information, the data being contained in the information about inspection. Then, the console creates the frame of information displayed as shown in FIG. 11 from the data and also from the received information about inspection (steps S3, S4). A search for the number assigned to the frame of information displayed is made (step S3). The address of the displayed frame having the number selected in step S3 is set (step S4-1). The addresses of the displayed characters are set (step S4-2). The frame of information selected using the display routine is displayed on the display panel 6b (step S4 $\propto$ 3). Steps S4—4 to S4-7 constitute a routine for displaying the inspection information received from the host computer 20 on the panel. An instruction indicating the position of displayed characters on the display panel is issued to the display controlled (step S4—4). The received information about inspection is converted into a pattern adapted for display (step S4-5). The data is written to the video RAM of the controller (step S4-6). A check is made to ascertain whether the received information about inspection has been fully displayed (step S4-7). If not so, then control returns the step S4—4, and the aforementioned procedure is repeated.

Inspections are effected, based on the information displayed on hte panel. The results of yhe inspections are entered by the use of the switches (step S5). Then the input data is stored in the memory (step S6). That is, the newest input data about the inspections is stored in the RAM 4 (FIG. 2). If the key designated "RET" is depressed, the requisite inspection is ended whether all the items of the inspection are complete or not (step S7). Data about inspection is sent to the host computer via the transmission line (step S8). It awaits polling (step S8-1). Data about inspection is transmitted (step S8-2). An acknowledgement signal is received (step S8-3).

Upon receiving the data about inspection, the host computer makes a decision to determine whether additional inspetin is needed or not, based on the received data. The programmable operator's console waits for the instruction for additional inspection for a certain period to see if a selection signal is transmitted (step S9). If such an instruction is not issued, then the inspection process is ended (step S10). If it is issued, control returns to step S2.

INDUSTRIAL APPLICABILITY

As described above, in accordance with the present invention, switches, characters, and data which are just sufficient to satisfy the present need can be displayed on the screen of the operator's console and, therefore, the console can be quite easily manipulated. Other switches, characters, and data can be displayed by switching the information presently displayed to another frame of information. That is, the screen can be utilized in a multiplex manner. Hence, the size of the console can be made very small compared with the number of switches, characters, and the items of data which can be used. Consequently, it is economical to fabricate. Since instructions produced by operating the console are transmitted to the controlled machine via the microcomputer system and the sequencer, the fundamental functions of the panel for controlling the machine suffice.

Further, the console functions to collect information about production control, such as the amount of production achieved by the controlled machine, the running time, and the rate of occurrence of substandard products. The information may be stored, or it may be subjected to given arithmetic operations, and the altered information is stored. The information in either form can be easily displayed by operator's instructions. As such, production can be adequately controlled. Also, the machine can be maintained appropriately.

The novel programmable operator's console is connected with the host computer via the communication line. This permits information about production control or statistical data about production to be transferred to the host computer. Therefore, the whole production equipment that is under the control of the console can be managed. Hence, the operation of the system is controlled efficiently.

Besides collecting and holding information about production control, the console sends the information to the host computer from which it receives requisite information about inspection at good timing. The received information is displayed on the display panel. Thus, appropriate instructions for operations or inspections are given to the operator of the machine. Therefore, the machine can be managed and inspected rationally. Further, the machine can be run with improved efficiency.

I claim:

1. A programmable operator's console for controlled interactive presentation of limited fields of information from a data base representative of data relating to one or more of control, test, operational results or monitoring of one or more external apparatuses, such presentation being reconfigurable so as to enable an operator to effectively oversee such data base while viewing only selected limited fields of information, comprising:

first means for coupling said console to an external apparatus to be controlled;

display means, further comprising display screen means and a plurality of overlaying transparent touch-sensitive switching means, for displaying in superimposed relation to said switching means a plurality of switch frames, switch function labels and control, test, operational or functional data in reconfigurable visual presentations;

a central processing unit, coupled to said first and display means, for providing to said display means configured visual display information, including switch functions and switch labels, responsive to data from one or both of said external apparatus and transparent switching means, and for providing control data to said external apparatus;

and storage means, coupled to said central processing unit, for storing data indicative of information to be displayed, including switch regions and switch labels;

whereby, particular transparent switching means are assigned different functions depending on information to be displayed in switch and display configurations selected for ease of comprehension of limited fields of information, while permitting an operator to oversee and control a data base including different categories of information.

2. A programmable operator's console as in claim 1, wherein said storage means comprises:

first memory means for storing image data including switch data indicative of said superimposed relation of switch regions on said display screen means; and second memory means for storing switch function labels and data indicative of said superimposed relation of said labels on said display screen means.

3. A programmable operator's console as in claim 2, further comprising;

third memory means, coupled to said central processing unit, for storing control data and operational and other external apparatus data;

whereby data representative of production rates, operational status and trouble conditions of an external apparatus may be received and stored for analysis and viewing on said display means.

4. A programmable operator's console as in claim 3, wherein said central processing unit is arranged to provide for read out of said image data from said first memory means and said apparatus data from said third memory means in response to actuation of predetermined ones of said transparent switching means, thereby enabling an operator to cause selected apparatus data to be displayed in said frames on said display screen means.

5. A programmable operator's console for controlled interactive presentation of limited fields of information from a data base representative of data relating to one or more of control, test, operational results or monitoring of one or more external apparatus, such presentation being reconfigurable so as to enable an operator to effectively oversee such data base while viewing only selected limited fields of information, comprising:

first means for coupling said console to an external apparatus to be controlled;

display means, further comprising display screen means and a plurality of overlaying transparent touch-sensitive switching means, for displaying in superimposed relation to said switching means a plurality of switch frames, switch function labels and control, test, operational or functional data in reconfigurable visual presentations;

a plurality of discrete switch means for permitting data entry independently of the configuration of said transparent switching means;

a central processing unit, coupled to said first, display and discrete switch means, for providing to said display means configured visual display information, including switch functions and switch labels, responsive to data from one or both of said external apparatus, transparent switching means and discrete switch means, and for providing control data to said external apparatus;

and storage means, coupled to said central processing unit, for storing data indicative of information to be displayed, including switch regions and switch labels;

whereby particular transparent switching means are assigned different functions depending on information to be displayed in switch and display configurations selected for ease of comprehension of limited fields of information, while permitting an operator to oversee and control a data base including different categories of information.

6. A programmable operator's console as in claim 5, wherein said storage means comprises:

first memory means for storing image data including switch data indicative of said superimposed relation of switch regions on said display screen means; and second memory means for storing switch function labels and data indicative of said superimposed relation of said labels on said display screen means.

7. A programmable operator's console as in claim 6, further comprising;

third memory means, coupled to said central processing unit, for storing control data and operational and other external apparatus data;

whereby data representative of production rates, operational status and trouble conditions of an external apparatus may be received and stored for analysis and viewing on said display means.

8. A programmable operator's console as in claim 7, wherein said central processing unit is arranged to provide for read out of said image data from said first memory means and said apparatus data from said third memory means in response to actuation of predetermined ones of said transparent switching means, thereby enabling an operator to cause selected apparatus data to be displayed in said frames on said display screen means. operator to effectively oversee such extended data base while viewing only selected limited fields of information, comprising:
- first means for coupling said console to an external apparatus to be controlled;
- second means for coupling said console to an external host computer;
- display means, further comprising display screen means and a plurality of overlaying transparent touch-sensitive switching means, for displaying in superimposed relation to said switching means a plurality of switch frames, switch function labels and control, test, operational or functional data in reconfigurable visual presentations;
- a plurality of discrete switch means for permitting data entry independently of the configuration of said transparent switching means;
- a central processing unit, coupled to said first, second, display and discrete switch means, for providing to said display means switch function, switch label and other configured visual display information responsive to data from one or more of said external apparatus, host computer, transparent switching means and discrete switch means, and for providing control data to said external apparatus;
- and storage means, coupled to said central processing unit, for storing data indicative of switch regions, switch labels and other information to be displayed;
- whereby, particular transparent switching means are assigned different functions depending on information 9. A programmable operator's console for controlled interactive presentation of limited fields of information from a data base representative of data relating to one or more of control, test, operational results or monitoring of one or more eternal apparatus, such presentation being reconfigurable so as to enable an operator to effectively oversee such data base while viewing only selected limited fields of information, comprising:
- first means for coupling said console to an external apparatus to be controlled;
- second means for coupling said console to an external host computer;
- display means, further comprising display screen means and a plurality of overlaying transparent touch-sensitive switching means, for displaying in superimposed relation to said switching means a plurality of switch frames, switch function labels and control, test, operational or functional data in reconfigurable visual presentations;
- a plurality of discrete switch means for permitting data entry independently of the configuration of said transparent switching means;
- a central processing unit, coupled to said first, second, display and discrete switch means, for providing to said display means configured visual display information, including switch functions and switch labels, responsive to data from one or more of said external apparatus, host computer, transparent switching means and discrete switch means, and for providing control data to said external apparatus;
- and storage means, coupled to said central processing unit, for storing data indicative of information to be displayed, including switch regions and switch labels;
- whereby, particular transparent switching means are assigned different functions depending on information to be displayed in switch and display configurations selected for ease of comprehension of limited fields of information, while permitting an operator to oversee and control a data base including different categories of information.

10. A programmable operator's console as in claim 9, wherein said first storage means comprises:
- first memory means for storing image data including switch data indicative of said superimposed relation of switch regions on said display screen means; and
- second memory means for storing switch function labels and data indicative of said superimposed relation of said labels on said display screen means.

11. A programmable operator's console as in claim 10, further comprising:
- third memory means, coupled to said central processing unit, for storing control data and operational and other external apparatus data;
- whereby data representative of production rates, operational status and trouble conditions of an external apparatus may be received and stored for analysis and viewing on said display means.

12. A programmable operator's console as in claim 11, wherein said central processing unit is arranged to provide for read out of said image data from said first memory means and said apparatus data from said third memory means in response to actuation of predetermined ones of said transparent switching means, thereby enabling an operator to cause selected apparatus data to be displayed in said frames on said display screen means.

13. A programmable operator's console as in claim 9, wherein said central processing unit additionally comprises:
- a communication port, coupled to said second means, for communicating with a hose computer adapted for operational control and management of said console and an external apparatus;
- means for transmitting information about operational control and status of said external apparatus to the said host computer via said communication port; and
- means for receiving information regarding control or inspection of said external apparatus from said host computer via said communication port;
- whereby the display means is enabled to display information, which may include such instructions, on the display screen means configured in relation to the transparent switching means so as to permit interactive use of such data and control of the external apparatus.

* * * * *

UNITED STATES PATENT AND TRADEMARK OFFICE
CERTIFICATE OF CORRECTION

PATENT NO. : 4,991,077

DATED : February 5, 1991

INVENTOR(S) : Kawasaki et al.

It is certified that error appears in the above-identified patent and that said Letters Patent is hereby corrected as shown below:

Delete Column 16, line 68 through Column 17, line 32;

Column 18, line 45, "hose" should read --host--;

Column 18, line 54, after "port" insert --, including instructions regarding operation of said external apparatus--.

Signed and Sealed this

Twenty-seventh Day of October, 1992

Attest:

DOUGLAS B. COMER

Attesting Officer     Acting Commissioner of Patents and Trademarks